(12) United States Patent
Sugiyama et al.

(10) Patent No.: US 11,322,922 B2
(45) Date of Patent: May 3, 2022

(54) ELECTRIC CONNECTION BOX

(71) Applicant: YAZAKI CORPORATION, Tokyo (JP)

(72) Inventors: Takashi Sugiyama, Makinohara (JP);
Kuninori Suzuki, Makinohara (JP);
Norio Watanabe, Makinohara (JP);
Yuji Sashida, Makinohara (JP);
Toshihisa Yagi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 70 days.

(21) Appl. No.: 17/096,919

(22) Filed: Nov. 12, 2020

(65) Prior Publication Data

US 2021/0143623 A1 May 13, 2021

(30) Foreign Application Priority Data

Nov. 13, 2019 (JP) .............................. JP2019-205563

(51) Int. Cl.
*H02G 3/14* (2006.01)
*B60R 16/023* (2006.01)
*H02G 3/08* (2006.01)

(52) U.S. Cl.
CPC ........... *H02G 3/14* (2013.01); *B60R 16/0238* (2013.01); *H02G 3/081* (2013.01)

(58) Field of Classification Search
CPC ....... H02G 3/14; H02G 3/081; B60R 16/0238

USPC .......................................................... 174/50
See application file for complete search history.

(56) References Cited

U.S. PATENT DOCUMENTS

| 8,210,378 B2* | 7/2012 | Takeuchi | ............... | H02G 3/088 |
| | | | | 174/50.5 |
| 2012/0055927 A1* | 3/2012 | I | ........................... | B60R 16/0238 |
| | | | | 220/315 |
| 2017/0207614 A1* | 7/2017 | Shiraki | ............... | B60R 16/0238 |

FOREIGN PATENT DOCUMENTS

JP 2013-74681 A 4/2013

* cited by examiner

*Primary Examiner* — Timothy J Thompson
*Assistant Examiner* — Michael F Mcallister
(74) *Attorney, Agent, or Firm* — Kenealy Vaidya LLP

(57) ABSTRACT

An electric connection box includes a housing having an opening formed by side walls, a lock protruding plate, a lid to be attached to the housing, a hook, a lock portion, a protective wall, lock pieces and slits. The protective wall is configured to, when the lid is attached to the housing, cover a cable connection portion provided on the second side wall. The lock pieces extend in parallel to the protective wall and extend from the protective wall toward a first direction. The pair of slits respectively includes a receiving opening to, when the lid is attached to the housing, accommodate respective one of the pair of lock pieces, the pair of slits being to receive the lock pieces when engagement at the lock portion is carried out. The receiving opening opens, when the lid is attached to the housing, toward a second direction.

6 Claims, 12 Drawing Sheets

ELECTRIC CONNECTION BOX

CROSS-REFERENCE TO RELATED APPLICATION

The present application claims priority to Japanese Patent Application No. 2019-205563 filed on Nov. 13, 2019, the entire content of which is incorporated herein by reference.

TECHNICAL FIELD

The present disclosure relates to an electric connection box.

BACKGROUND

An electric connection box in the related art that is mounted on a vehicle to accommodate electrical components includes a cable connection portion on a side wall (for example, see JP2013-74681A). In the electric connection box in the related art, the cable connection portion includes an opening window, a slide cover installed to the opening window, and a harness through hole provided in the slide cover. The cable connection portion may also include an input terminal portion. In this type of electric connection box 501 illustrated in FIG. 11, a cable connection portion 507 is provided on a side wall 505 of a housing 503. The cable connection portion 507 includes an input terminal portion 509 that connects a terminal attached to an end of a power supply cable. The terminal attached to the end of the power supply cable is fixed to the input terminal portion 509 and is thereby electrically connected to an electrical component accommodated in the housing 503 via a bus bar that is conductively connected to the input terminal portion 509.

The power supply cable connected to a fastening portion of the input terminal portion is led out downward from the cable connection portion 507. A plate-shaped protective wall 513 hangs on a lid 511 attached to the housing 503, and covers a part of the power supply cable that is connected together with the cable connection portion 507. In the electric connection box 501 in which the lid 511 is vertically fitted, the lid 511 is attached by being translated in a substantially vertical direction from above the housing 503 and covering the opening 515. For this reason, the cable connection portion 507 is provided with slits 519 that extend vertically to guide side edges 517 on both sides of the protective wall 513. As illustrated in FIG. 12, the slits 519 are opened such that protective wall receiving openings 521 face with each other. The slits 519 of the electric connection box 501 receive the side edges 517 of the protective wall 513 that is moved from above. As a result, the protective wall 513 of the electric connection box 501 is attached to the housing 503 without being separated from the side wall 505 so that water can be prevented from entering into the cable connection portion 507.

However, in addition to the above-described vertical fitting, rotational fitting may be desired in which the lid 511 is rotated to be fitted with the electric connection box in the related art. In a rotational fitting electric connection box, a lock portion is locked and the lid 511 is attached to the housing 503 by pressing down one side of the lid 511 toward the housing 503 about another side of the lid 511 (with the another side of the lid 511 as a rotational axis). In the rotational fitting electric connection box, the plate-shaped protective wall 513 rotates together with the rotation of the lid 511. For this reason, the rotation trajectory of the protective wall 513 drawn in an arc shape along with the movement of the lid 511 interferes with a pair of slits 519 with the protective wall receiving openings 521 facing with each other as illustrated in FIG. 12. The plate-shaped protective wall 513, whose side edges 517 on both sides are guided, is rotated in a state of being parallel to a plane perpendicular to a rotation center (plane that is perpendicular to a paper surface of FIG. 12 and parallel to the protective wall 513), for example. For this reason, the lid 511 cannot be inserted between the pair of parallel slits 519 that vertically extend on a plane parallel to the plane, since the arc-shaped trajectory interferes with the slits 519. At the same time, since the protective wall 513 interferes, the lid 511 cannot be fitted to the housing 503. However, there is a demand for the protective wall 513 to be attached to the electric connection box which applies rotational fitting if the lid without the protective wall being separated from the side wall 505 and for the cable connection portion 507 to be prevented from being entered by water.

SUMMARY

Illustrative aspects of the present invention provide an electric connection box whose lid can be vertically fitted and rotationally fitted to a housing and that can prevent water from entering into a cable connection portion provided on a side wall of the housing.

According to an illustrative aspect of the present invention, an electric connection box includes a housing having an opening formed by an upper end of each of a plurality of side walls, a lock protruding plate protruding on an outer surface of a first side wall of the plurality of side walls, the first side wall being along a side of the opening, a lid configured to be attached to the housing while covering the opening, a hook protruding downward from the lid, a lock portion provided on each of the lid and the housing, a protective wall protruding downward from the lid, a pair of lock pieces formed on side edges on both sides of the protective wall along a direction in which the protective wall extends, and a pair of slits provided on a second side wall of the plurality of side walls. The hook is configured to rotate the lid such that the lid is attached to the housing with the hook being engaged with the locking protruding plate. The lock portion is configured to fix the lid to the plurality of side walls. The protective wall is configured to, when the lid is attached to the housing, cover a cable connection portion provided on the second side wall. The pair of lock pieces extend in parallel with the protective wall and extend from the protective wall toward a first direction. Each of the pair of slits respectively includes a receiving opening configured to, when the lid is attached to the housing, accommodate respective one of the pair of lock pieces, the pair of slits being configured to receive the respective one of the pair of lock pieces when engagement at the lock portion is carried out. The receiving opening opens, when the lid is attached to the housing, toward a second direction.

Other aspects and advantages of the invention will be apparent from the following description, the drawings and the claims.

DESCRIPTION OF EMBODIMENTS

Figure 1:
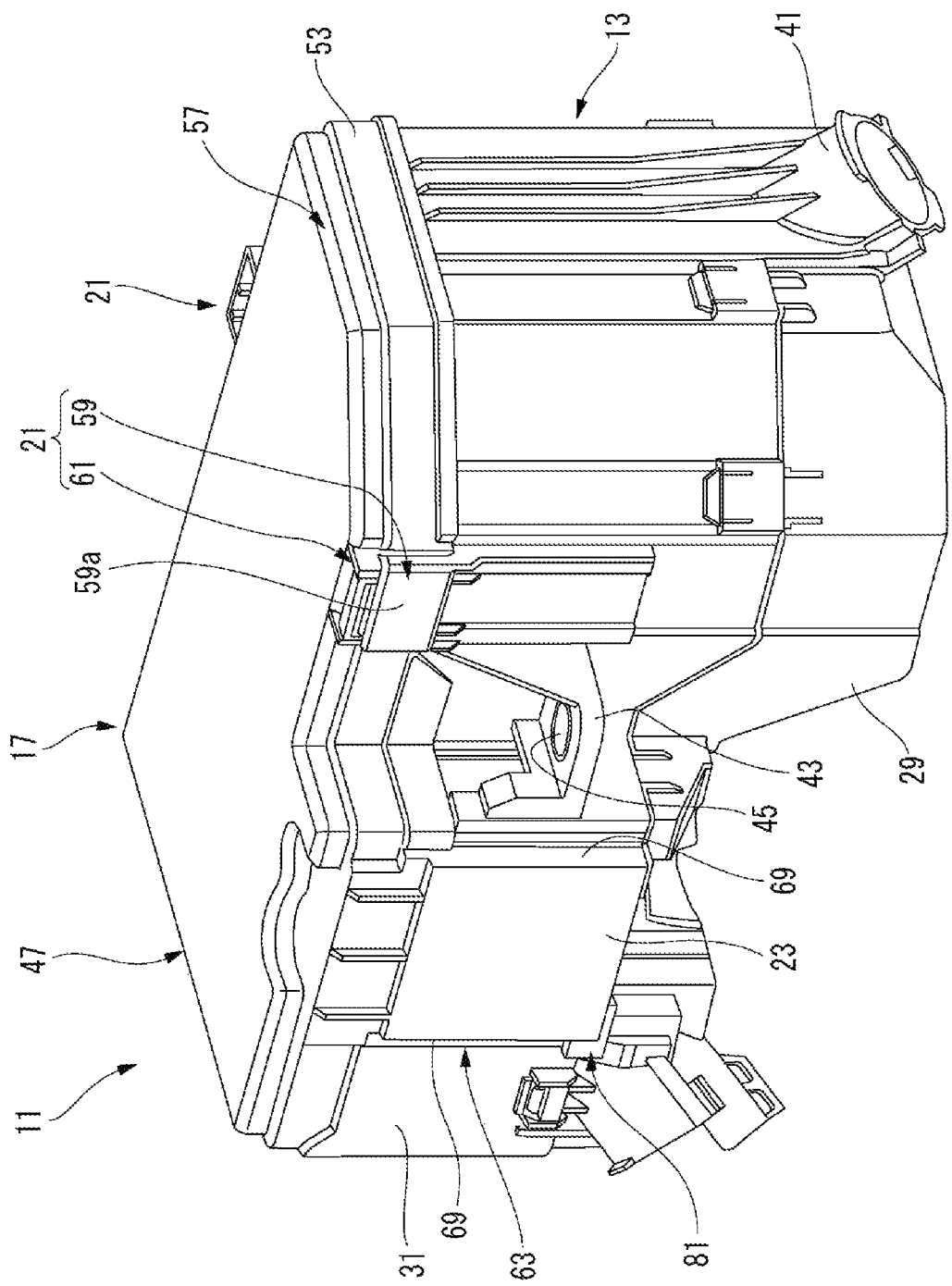
FIG. 1 is a perspective view illustrating an external appearance of an electric connection box according to an embodiment of the present disclosure.

Hereinafter, an embodiment according to the present disclosure will be described below with reference to the drawings. FIG. 1 is a perspective view illustrating an external appearance of an electric connection box 11 according to the embodiment of the present disclosure. The electric connection box 11 according to the present embodiment is mounted on a vehicle, for example, and is interposed between a power supply (secondary battery) (not illustrated) of the vehicle and an electronic device to adjust power supplied from the power supply to the electronic device. The electric connection box 11 may also be referred to as a relay box, a fuse box, a connection box, or the like.

The electric connection box 11 according to the present embodiment includes, as main configurations, a housing 13, lock protruding plates 15 projecting on an outer surface of a side wall 31 of the housing 13, a lid 17, hooks 19 formed on a hanging wall 53 of the lid 17, lock portions 21 provided between the lid 17 and the housing 13, a protective wall 23 extending downward from the lid 17 and provided with respective to the side wall 31, a pair of lock pieces 25a, 25b formed on corresponding side edges on both sides of the protective wall 23 in a hanging-down direction, and a pair of slits 27a, 27b provided on the side wall 31.

The housing 13 has a box shape defined by the side wall 31 (also referred to as a frame) and includes an under cover 29 installed at a lower portion thereof. The housing 13 has a polygonal opening 33 (see FIGS. 2 and 3) defined by upper ends on the entire periphery of the side wall 31. The upper ends of the side wall 31 serve as a packing abutment end surface 37 against which a packing 35 (see FIG. 3) installed on the lid 17 abuts. The housing 13 and the under cover 29 are formed of an insulating resin.

Figure 10:
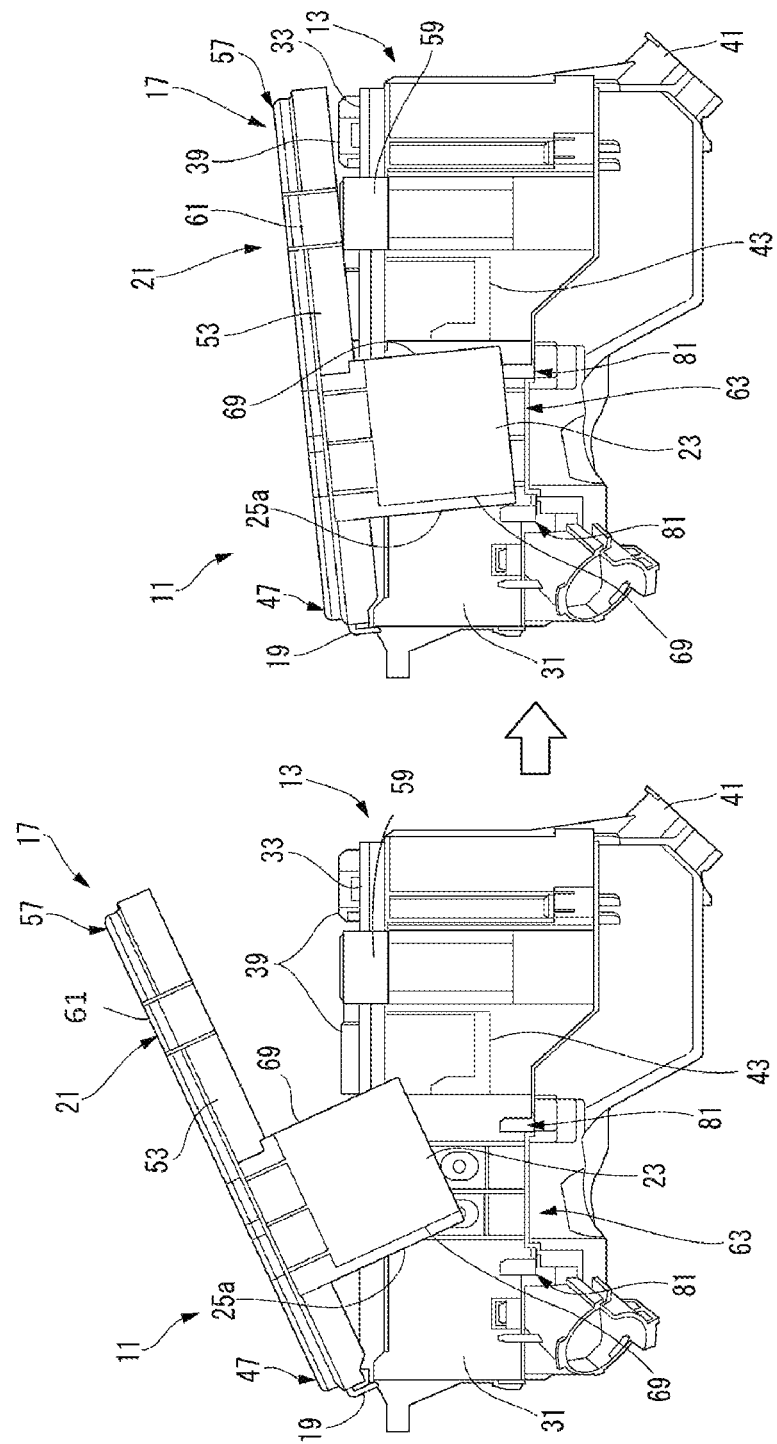
FIG. 10 is a side view illustrating a rotational fitting process of the electric connection box illustrated in FIG. 1.
Figure 11:
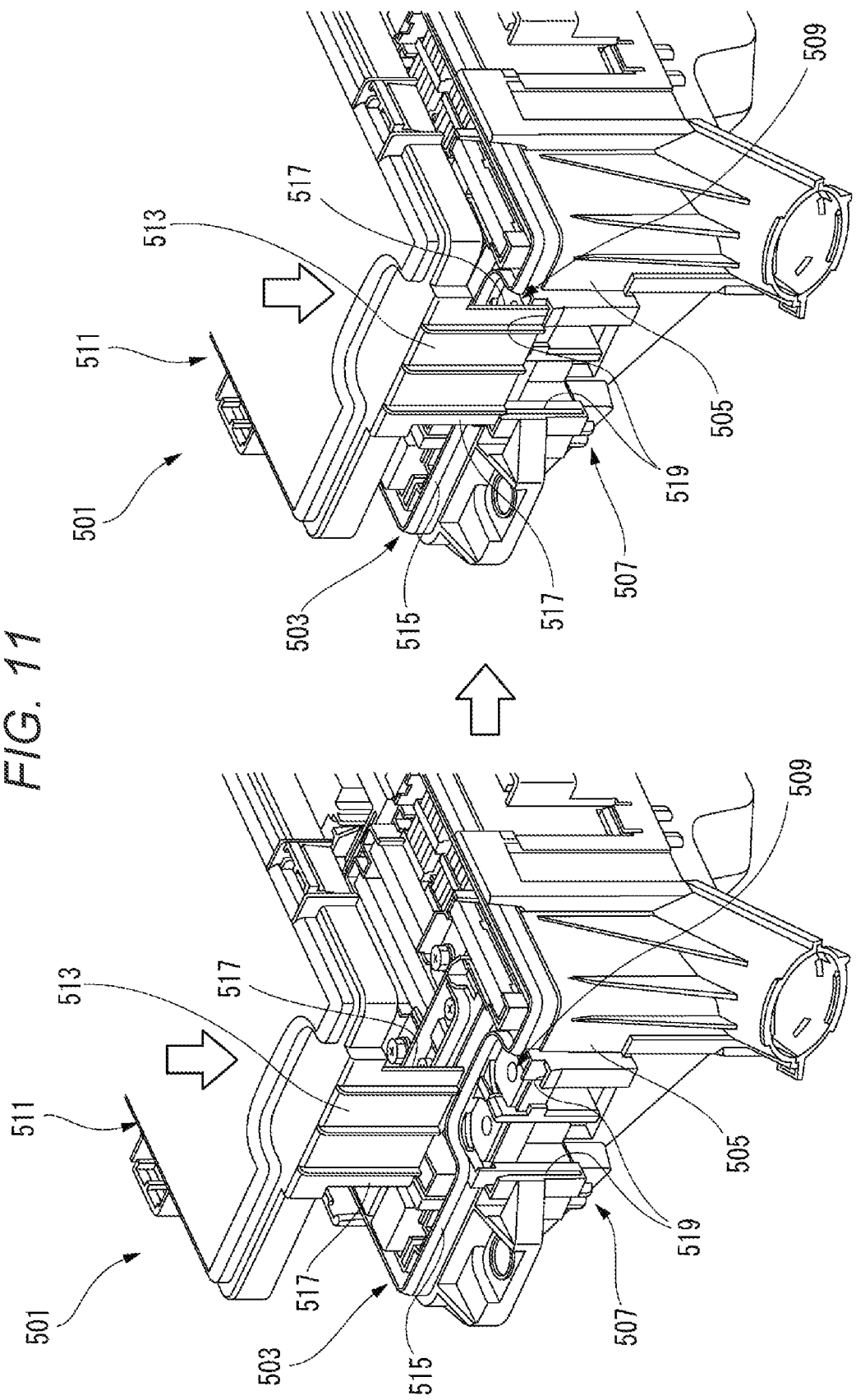
FIG. 11 is an exploded perspective view of a main portion of an electric connection box in the related art and illustrates a vertical fitting process thereof.
Figure 12:
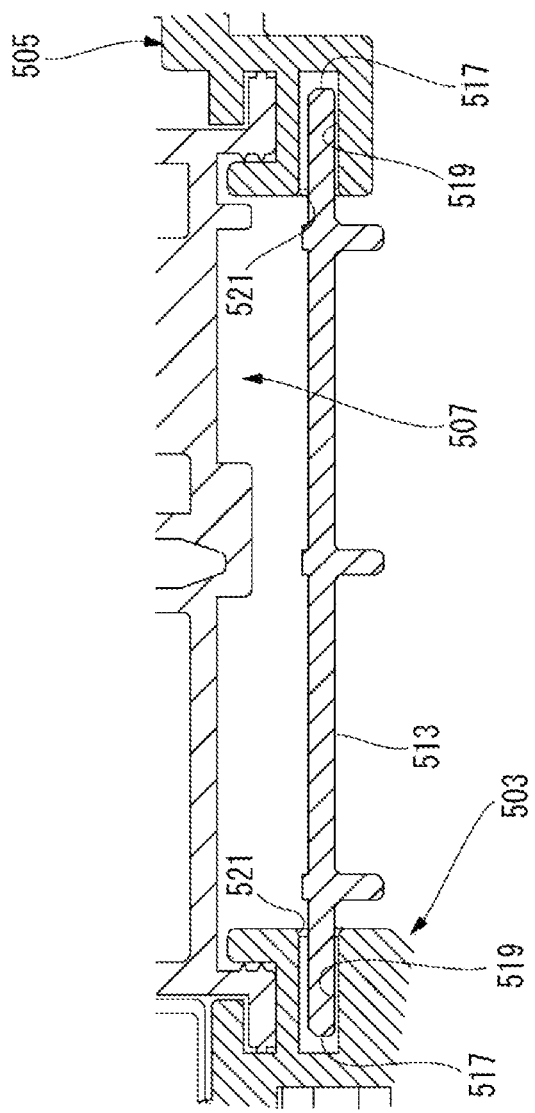
FIG. 12 is a plan sectional view in the vicinity of a cable connection portion of the electric connection box illustrated in FIG. 11.

The housing 13 accommodates a plurality of electronic components (not illustrated). The electronic components accommodated in the housing 13 include, for example, a relay, a fuse, or a fusible link. Each of the electronic components includes an electronic component body (not illustrated) such as a relay body or a fuse body disposed inside the housing 13, and a plurality of terminals (not illustrated) that are electric connection portions electrically connected to the electronic component body. The terminals of the electronic component are electrically connected to electric wires (not illustrated). In the present specification, the electronic components, the terminals, the electric wires, and the like are collectively referred to as electrical components 39 (FIG. 10).

One end portion of an electric wire is connected to a terminal of an electronic component, and the other end portion is connected to the power supply (secondary battery) or the electronic device. The electric wire is led out to the outside of the housing 13 from a tubular electric wire insertion portion 41 formed on the housing 13. The plurality of electric wires drawn out from the housing 13 are bundled together by an exterior member such as an adhesive tape or a corrugated tube.

The housing 13 includes a plurality of (two in this embodiment) fixing brackets 43 protruding vertically from the side wall 31. Each of the fixing brackets 43 has a bolt insertion hole 45 passing therethrough. A bolt inserted into the bolt insertion hole 45 is fastened to a body panel, so that the electric connection box 11 is fixed in a predetermined position of an engine compartment, for example.

Figure 2:
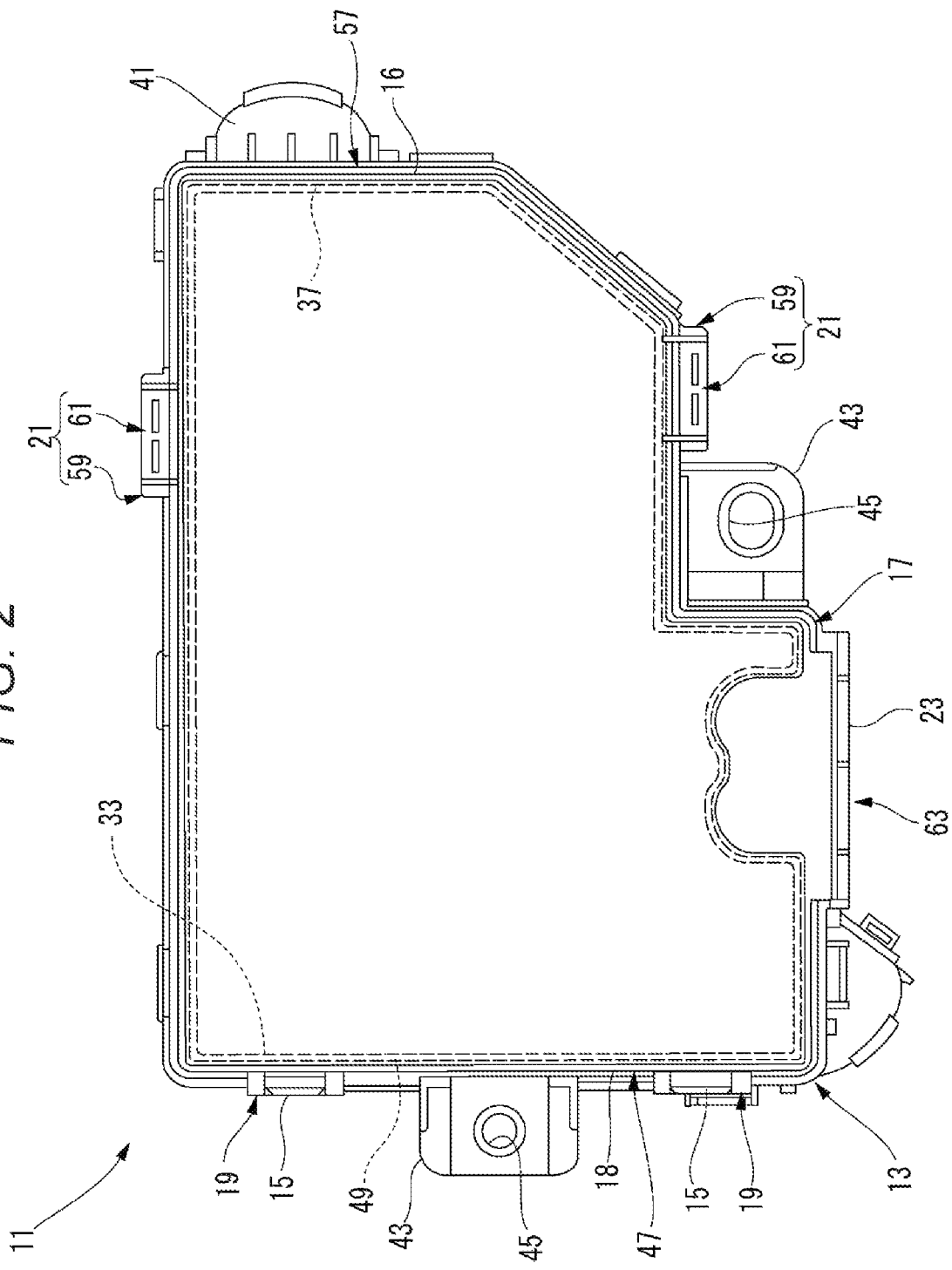
FIG. 2 is a plan view of the electric connection box in FIG. 1.

FIG. 2 is a plan view of the electric connection box 11 in FIG. 1. Here, the opening 33 and the lid 17 of the housing 13 have substantially similar shapes in a plan view. In the present embodiment, the polygonal shape is a heptagon obtained by cutting one corner portion of a rectangular shape by a quadrangle to form a recess and chamfering a newly formed corner portion to form a hypotenuse. One of seven sides of the heptagon is a hypotenuse and the other sides are connected at right angles to adjacent sides. In addition, one corner portion of the polygon forms an inside corner and the other corner portions form outside corners. The polygon is an example, and the shape of the electric connection box 11 according to the present embodiment is not limited to a polygon.

Figure 3:
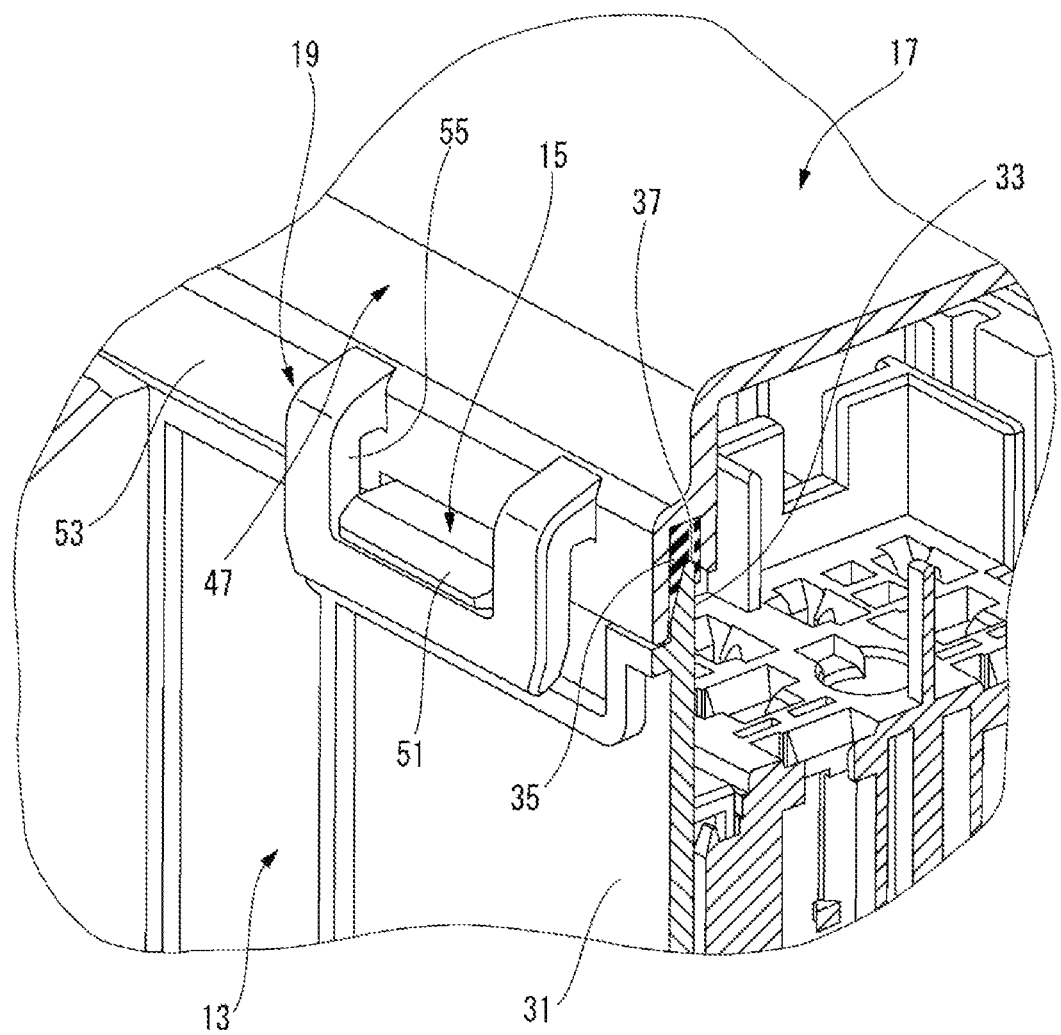
FIG. 3 is a perspective view of a main portion obtained by cutting a part representing a rotation base portion of a lid.

FIG. 3 is a perspective view of a main portion obtained by cutting a part representing a rotation base portion 47 of the lid 17. The lock protruding plates 15 protrude from the outer surface of the side wall 31 along a side 49 (see FIG. 2) of the opening 33. In the present embodiment, two lock protruding plates 15 are arranged apart from each other in a direction along the side 49. The lock protruding plate 15 is formed in a rectangular shape having a long side along the side 49. The lock protruding plate 15 has a top end inclined surface 51 that inclines downward toward a protruding top end on an upper surface thereof. The top end inclined surface 51 serves as a guide surface when the lid 17 is vertically fitted and attached to the housing 13. A lower surface of the lock protruding plate 15 opposite to the top end inclined surface 51 serves as a flat lock surface (not illustrated) perpendicular to the side wall 31. The hook 19 of the lid 17 is hooked (locked) on the lock surface of the lock protruding plate 15.

The lid 17 includes the hanging wall 53 that covers the outer side of the side wall 31. The hanging wall 53 is formed around an entire periphery of the lid 17. In the lid 17, the frame-shaped hook 19 that engages with the lock protruding plate 15 is formed on the hanging wall 53 along the side 49 of the opening 33. The hook 19 is hooked by inserting the lock protruding plate 15 into a quadrangle frame-shaped inner hole 55. Above the inner hole 55, there is formed an interference avoiding recess (not illustrated) that avoids interference between the hanging wall 53 and the lock protruding plate 15 by cutting down a lower end of the hanging wall 53. By hooking the hook 19 on the lock protruding plate 15, the lid 17 engaged with the housing 13 is restricted from moving upward from the side 49 of the opening 33 and in a direction opposite to a projecting direction of the lock protruding plate 15.

When the lid 17 is rotationally fitted, the lid 17 is rotated about hooks 19 engaged with the lock protruding plates 15 (i.e., a side of the electric connection box along which the hooks 19 are provided as a rotational axis of the rotational fitting). The rotated lid 17 covers the opening 33 and is rotationally fitted to the housing 13. In the lid 17, aside 18 of the lid 17 along the side 49 of the opening 33 serves as the rotation base portion 47 (the rotational axis), and another side 16 opposite to the side 18 serves as a rotation top end portion 57. When the lid 17 is attached by rotational fitting, the rotation top end portion 57 is pressed by an operator in a direction of approaching the housing 13.

The lid 17 is fixed to the housing 13 by the lock protruding plates 15, the hooks 19, and a plurality of lock portions 21 provided at the lid 17 and the housing 13 in both of rotational fitting and vertical fitting.

As illustrated in FIG. 2, a pair of lock portions 21 are provided in two positions of each of the lid 17 and the housing 13 in which the rotation top end portion 57 is sandwiched between the two positions. The lock portion 21 includes a housing-side lock 59 provided on the housing 13 and a lid-side lock 61 provided on the lid 17.

The housing-side lock 59 includes a lock wall 59a having a lock gap between the housing-side lock 59 and the side wall 31. The lock wall 59a includes a lock claw (not illustrated) projecting into the lock gap. The lid-side lock 61 includes a lock plate (not illustrated) to be inserted into the lock gap. The lock plate has a lock hole (not illustrated) to which the lock claw is locked.

Therefore, when the lid 17 is pressed down, the lock plate of the lid-side lock 61 of each of the lock portions 21 is inserted into the lock gap of the housing-side lock 59. When the lid 17 is further pressed down, the lock hole of the lock plate is locked to the lock claw of the lock wall 59a, so that the lid-side lock 61 is restricted from being separated from the housing-side lock 59. As a result, the lid 17 is fixed to the housing 13 by the pair of hooks 19 and the pair of lock portions 21.

Figure 4:
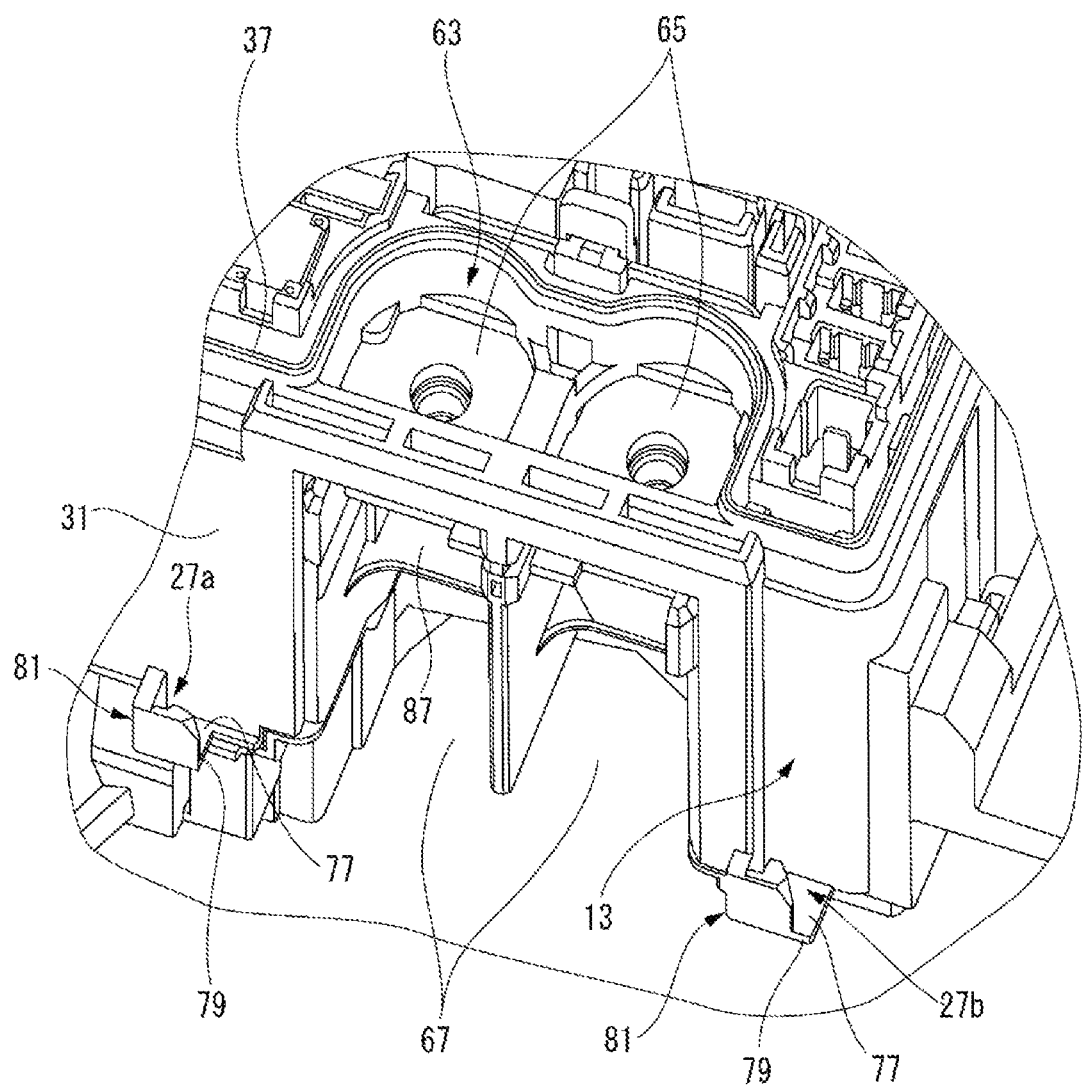
FIG. 4 is a perspective view of a cable connection portion.

FIG. 4 is a perspective view of a cable connection portion 63. The cable connection portion 63 is provided on the side wall 31 of the housing 13. The cable connection portion 63 includes input terminal portions 65 to which a power supply cable (not illustrated) is connected. Harness lead-out spaces 67 are defined below the corresponding input terminal portions 65. The input terminal portions 65 are electrically connected to the electrical components 39 accommodated in the housing 13 via a bus bar provided in the housing 13 by insert molding or the like. Terminals attached to an end of the power supply cable are fastened and conductively connected to the input terminal portions 65 by bolts (not illustrated). The cable connection portion 63 has the upper input terminal portions 65 at an upper portion and the side harness lead-out spaces 67 at a side portion covered by the protective wall 23 that is formed on the lid 17 and hangs in parallel to the side wall 31. The cable connection portion 63 covered by the protective wall 23 leads the power supply cable out from below the protection wall 23.

Figure 5:
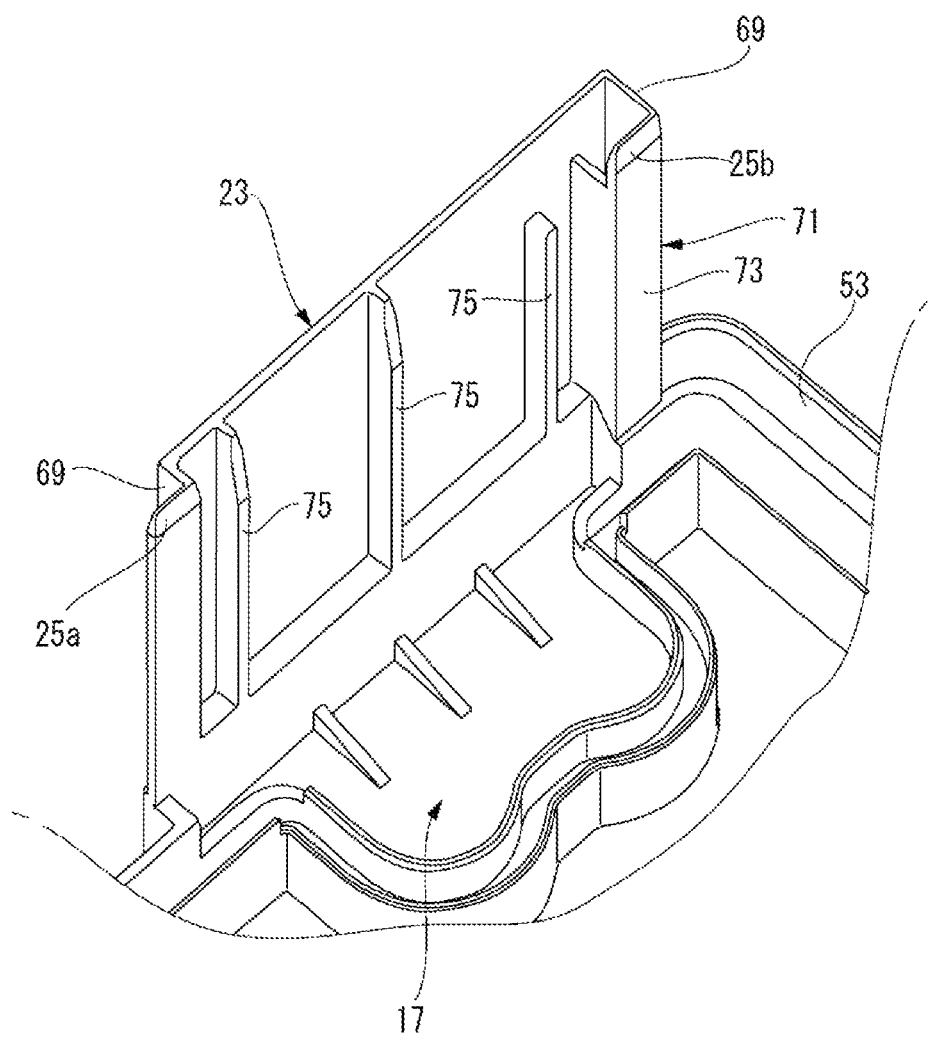
FIG. 5 is a perspective view of a main portion of the lid when a protective wall is viewed from a back side.

FIG. 5 is a perspective view of a main portion of the lid 17 when the protective wall 23 is viewed from a back side. The pair of lock pieces 25a, 25b are formed on corresponding side edges 69 on both sides of the protective wall 23, the side edges 69 extending in a vertical direction. The pair of lock pieces 25a, 25b are parallel to the protective wall 23 and face the same direction with each other (i.e., The pair of lock pieces 25a, 25b both extend from the protective wall (23) toward a first direction).

A tubular portion 71 is formed on at least one lock piece 25b of the pair of lock pieces 25a, 25b. The tubular portion 71 extends along the lock piece 25b, and shares a portion of the lock piece 25b as a tubular side wall 73 extending in the vertical direction. A plurality of reinforcing ribs 75 extending in the vertical direction of the protective wall 23 are formed on an inner side of the protective wall 23, and are spaced apart from each other in a width direction of the protective wall 23. The tubular portion 71 and the reinforcing ribs 75 prevent the protective wall 23 from deforming in a direction away from the side wall 31 when the lid 17 is attached to the housing 13.

Figure 6:
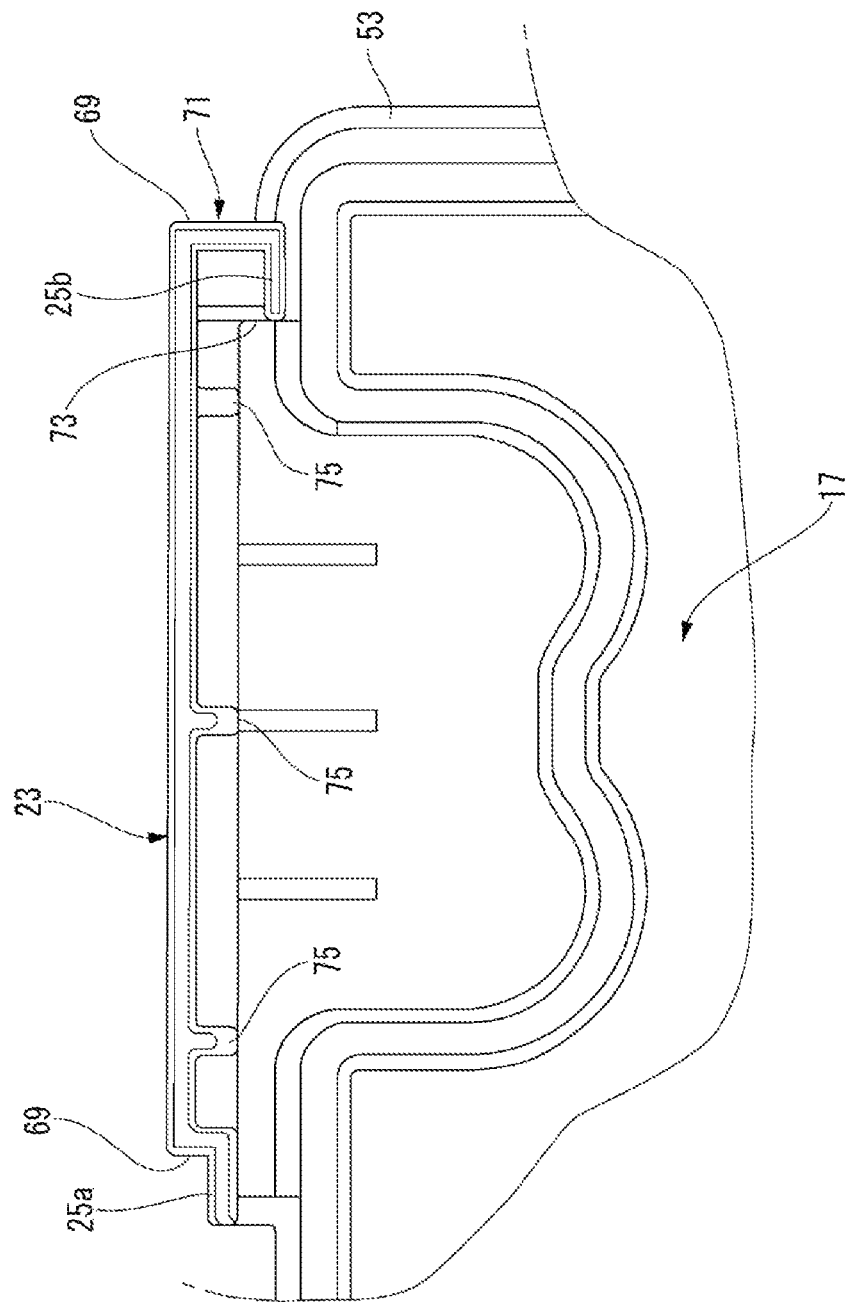
FIG. 6 is a bottom view of the main portion of the lid when the protective wall is viewed from a bottom side.

FIG. 6 is a bottom view of the main portion of the lid 17 when the protective wall 23 is viewed from a bottom side. The pair of lock pieces 25a, 25b, when the lid 17 is attached to the housing 13, both project toward a rotation center of the lid 17 (leftward in FIG. 6). The lock piece 25a on a left side of FIG. 6 is bent and projects in a crank shape from the side edge 69 of the protective wall 23. The lock piece 25b on a right side of FIG. 6 can be obtained by bending the corresponding side edge 69 of the protective wall 23 by 180° such that the tip end thereof extends towards the same direction as the lock piece 25a on the left side. The lock piece 25b on the right side of FIG. 6 is formed in a position closer to the side wall 31 than the lock piece 25a on the left side of FIG. 6 is.

As illustrated in FIG. 4, the pair of slits 27a, 27b have corresponding protective wall receiving openings 77 that face another same direction to receive the pair of lock pieces 25a, 25b when the lid 17 is attached to the housing 13 (i.e., the receiving opening (77) opens, when the lid (17) is attached to the housing (13), toward a second direction). In the present embodiment, since the pair of lock pieces 25a, 25b project toward the rotation center, the pair of protective wall receiving openings 77 are opened to a side opposite to the rotation center (i.e., the first direction and the second direction are opposite to each other). Each of the slits 27a, 27b is formed with an L-shaped wall 81 erected on a slit bottom plate 79 projecting, perpendicularly with respect to the side wall 31, from the side wall 31. Since the L-shaped wall 81 is erected on the slit bottom plate 79, each of the slits 27a, 27b has an upper end opening 83 and a side end opening 85 (see FIG. 8).

The slits 27a, 27b are disposed near a lower end of the protective wall 23. Slit bottom plates 79 are disposed near the lower end of the protective wall 23 and thereby start receiving the lock pieces 25a, 25b when the engagement of the lock portions 21 is started.

Figure 7:
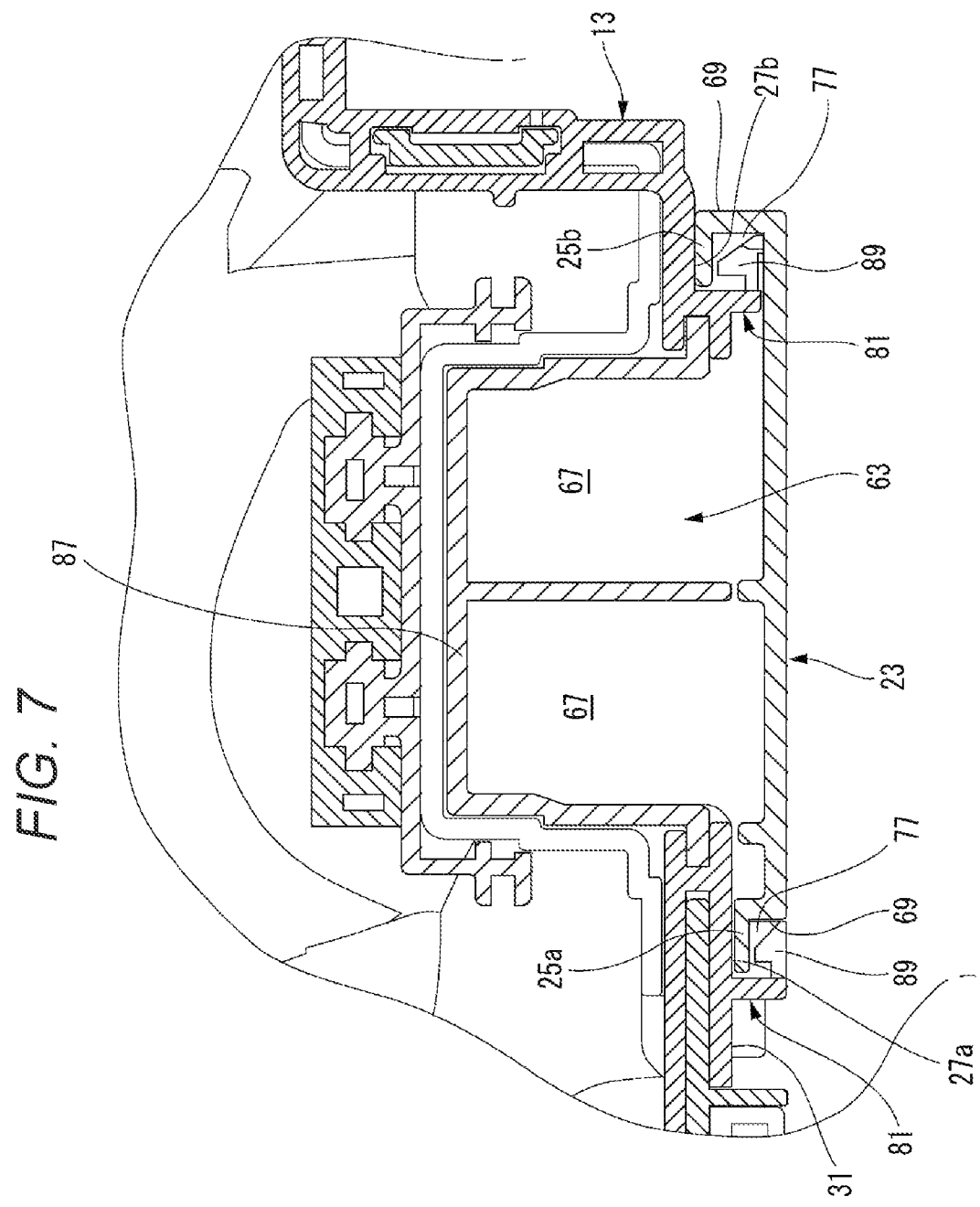
FIG. 7 is a plan sectional view in the vicinity of the cable connection portion of the electric connection box illustrated in FIG. 1.

FIG. 7 is a plan sectional view in the vicinity of the cable connection portion 63 of the electric connection box 11 illustrated in FIG. 1. A nut holder 87 constituting the cable connection portion 63 is attached to the side wall 31 of the housing 13. The input terminal portions 65 are provided at an upper end of the nut holder 87. When the pair of lock pieces 25a, 25b are engaged with the pair of slits 27a, 27b formed on the side wall 31, the protective wall 23 is restricted from moving in a direction away from the side wall 31 and covers the cable connection portion 63.

Figure 8:
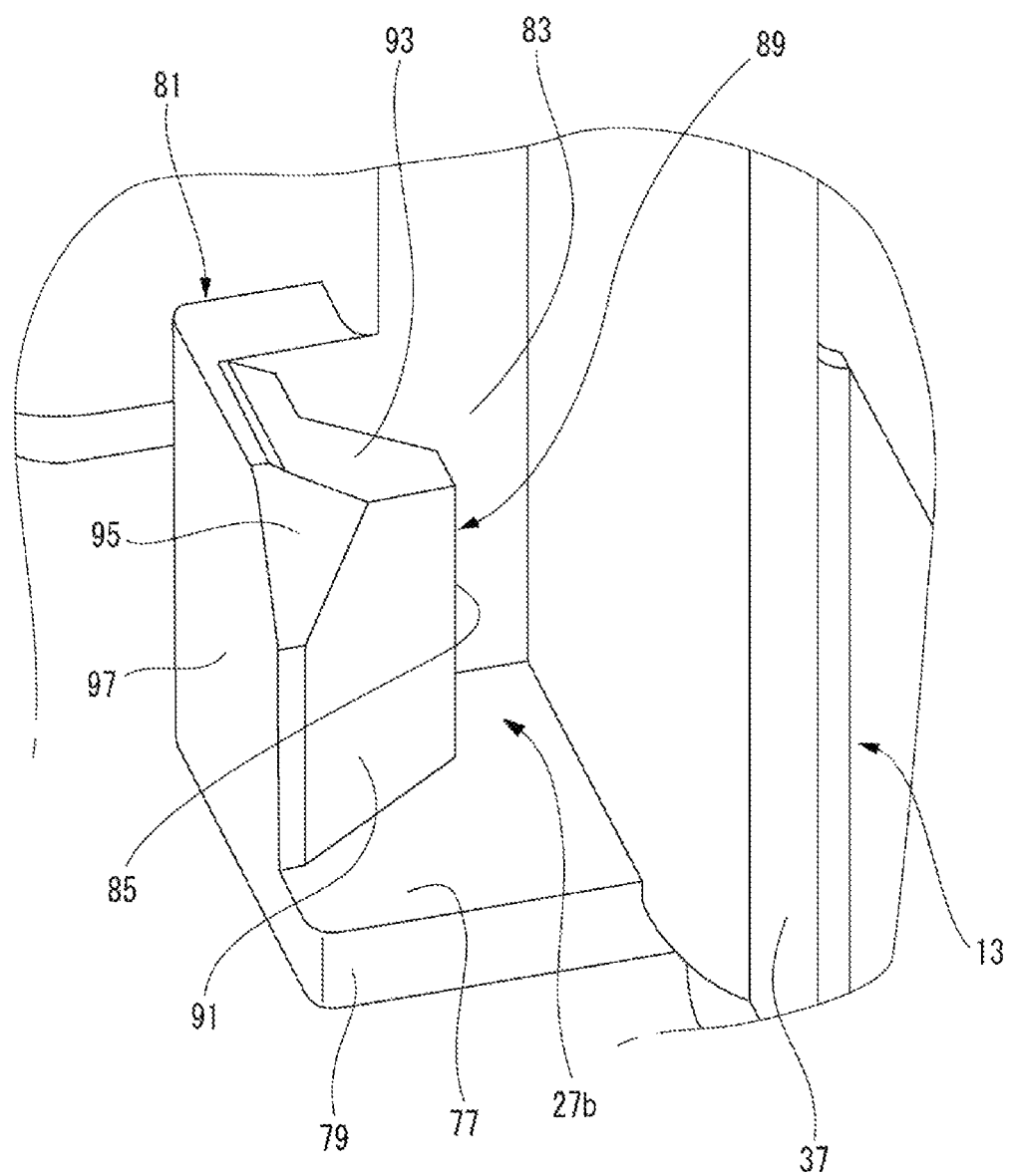
FIG. 8 is an enlarged perspective view of a main portion of a slit.

FIG. 8 is an enlarged perspective view of a main portion of the slit 27b. Each of the protective wall receiving openings 77 of the pair of slits 27a, 27b is provided with a protective wall guide projection 89. The protective wall guide projection 89 includes a widened tapered portion 91

(first tapered portion), a downward tapered portion 93 (second tapered portion), and a chamfered tapered portion 95 (third tapered portion).

The widened tapered portion 91 is provided on a front surface of the protective wall guide projection 89 in a direction from which the protective wall 23 enters (i.e., the widened tapered portion 91 is provided on an end surface of the protective wall guide projection 89 in the second direction) and is formed by gradually widening the slit width toward a front side of each of the slits 27a, 27b (i.e., the widened tapered portion 91 is formed such that a width of the pair of slits 27a, 27b gradually increases toward the second direction). The downward tapered portion 93 is provided on an upper surface of the protective wall guide projection 89 and is inclined downward toward the upper end opening 83 of each of the slits 27a, 27b (i.e., the downward tapered portion 93 is inclined downward toward an inner space within each of the pair of slits 27a, 27b). The chamfered tapered portion 95 is formed by chamfering a corner portion where the widened tapered portion 91, the downward tapered portion 93, and a projecting outer surface 97 of the protective wall guide projection 89 intersect with each other.

Next, functions of the above configurations will be described (i.e., the chamfered tapered portion 95 is formed by chamfering a corner portion defined by the widened tapered portion 91, the downward tapered portion 93, and an outer surface of the protective wall guide projection 89). In the electric connection box 11 according to the present embodiment, the lid 17 can be both vertically fitted and rotationally fitted to the opening 33 of the housing 13. In vertical fitting, the lid 17 is attached by being translated in a substantially vertical direction from above the housing 13 and covering the opening 33. In rotational fitting, the lid 17 is rotated about the hooks 19 by engaging the hooks 19 provided on the lid 17 with the lock protruding plates 15 provided on the side wall 31 along the side 49 of the housing 13. The rotated lid 17 covers the opening 33 and is attached to the housing 13. The lid 17 attached to the housing 13 is locked in a fitted state by the lock portions 21 provided between the lid 17 and the housing 13.

The cable connection portion 63 is provided on the outer surface of the side wall 31. The protective wall 23, which is parallel to the side wall 31 when the lid 17 is attached to the housing 13 and covers the cable connection portion 63 from outside, hangs down from the lid 17. On the protective wall 23, the lock pieces 25a, 25b parallel to the protective wall 23 are formed on the corresponding side edges 69 on both sides in the hanging-down direction (vertical direction). Accordingly, the pair of lock pieces 25a, 25b are provided on the protective wall 23. The pair of lock pieces 25a, 25b extend toward the same direction with each other.

The pair of slits 27a, 27b are formed on the side wall 31 provided with the cable connection portion 63, and the protective wall receiving openings 77 (receiving openings) for receiving the pair of lock pieces 25a, 25b open toward the same direction with each other. Each of the protective wall receiving openings 77 of the slits 27a, 27b has an opened upper end and an opened side end that open toward a corresponding one of the pair of lock pieces 25a, 25b when the lid 17 is being attached to the housing 13.

Figure 9:
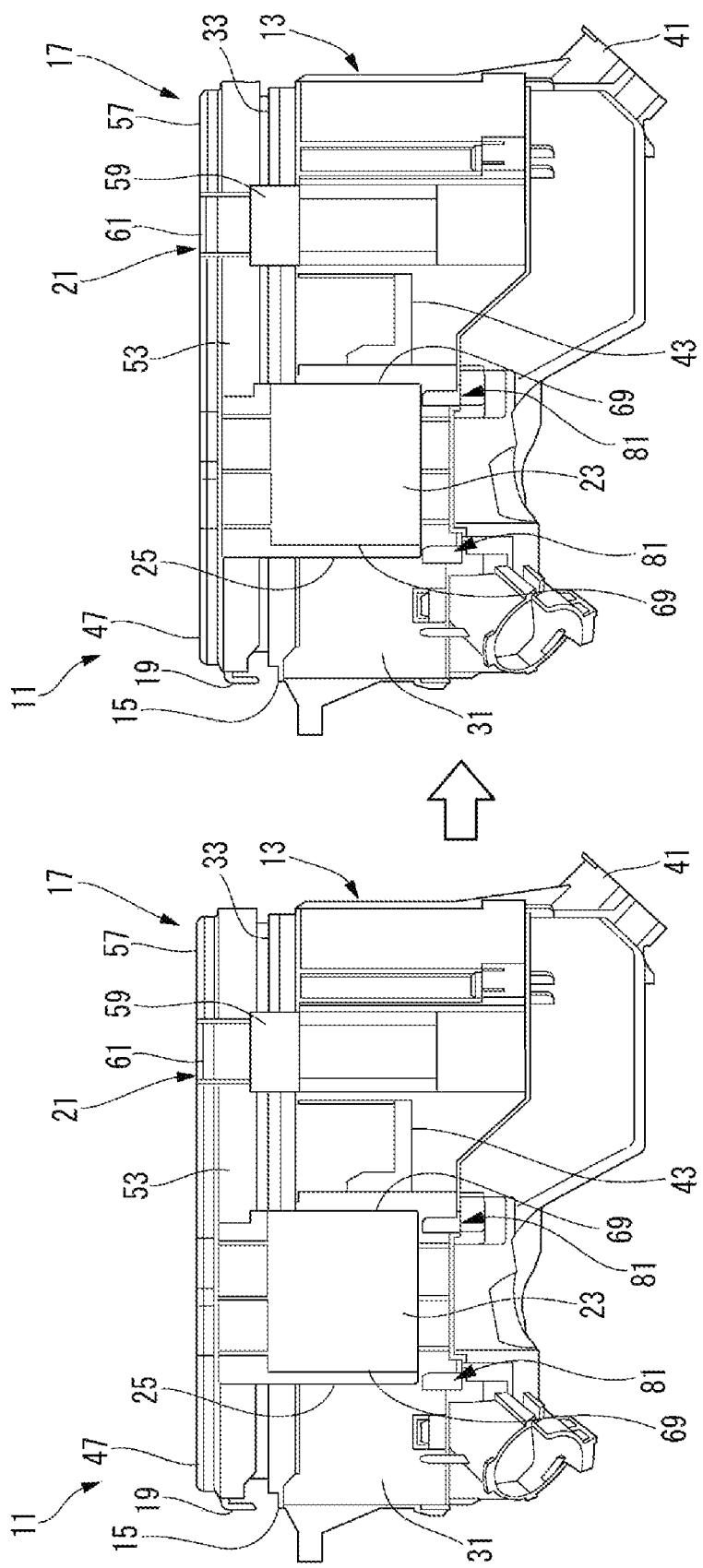
FIG. 9 is a side view illustrating a vertical fitting process of the electric connection box illustrated in FIG. 1.

FIG. 9 is a side view illustrating a vertical fitting process of the electric connection box 11 illustrated in FIG. 1. In the electric connection box 11 according to the present embodiment, when the lid 17 is vertically fitted, lower ends of the side edges 69 on both sides of the protective wall 23 approach the slits 27a, 27b from upper end openings 83 of the protective wall receiving openings 77. When the lock pieces 25a, 25b provided on the side edges 69 on both sides of the protective wall 23 are respectively inserted into the slits 27a, 27b of the side wall 31, both sides of a lower end of the protective wall are locked to the side wall 31, and the protective wall 23 is restricted from being separated (floated) from the side wall 31 so that the cable connection portion 63 can be reliably covered.

FIG. 10 is a side view illustrating a rotational fitting process of the electric connection box 11 illustrated in FIG. 1. One the other hand, in the electric connection box 11 according to the present embodiment, the lid 17 may be rotationally fitted. The protective wall 23 is formed such that, for example, the lock piece 25a of one side edge 69 extends toward the rotational axis when the lid 17 is attached to the housing 13, and the lock piece 25b of the other side edge 69 extends toward the same direction as the lock piece 25a of the one side edge 69. That is, the lock pieces 25a, 25b formed on the side edges 69 on both sides are parallel to the protective wall 23 and tip end thereof extend in the same direction (first direction).

The pair of slits 27a, 27b that receive the pair of lock pieces 25a, 25b are formed on the side wall 31 provided with the cable connection portion 63. The pair of slits 27a, 27b have the corresponding protective wall receiving openings 77 that open the same direction (second direction) to receive the pair of lock pieces 25a, 25b. That is, at the time of rotational fitting, the pair of lock pieces 25a, 25b facing the same direction are respectively received in the pair of protective wall receiving openings 77 that open in another same direction. The slits 27a, 27b are arranged on the lower end of the protective wall 23 in the vertical direction. When the lid 17 is rotated and the engagement of the lock portion 21 is started, the pair of slits 27a. 27b are disposed in positions to receive the lock pieces 25a, 25b.

When the protective wall 23 hangs down along the side wall 31 provided with the cable connection portion 63 from, for example, the side 49 of the lid 17 that is orthogonal to the rotation center, or rotational axis of the lid 17, the protective wall 23 rotates in parallel to a virtual plane orthogonal to the rotation axis when the lid 17 is rotationally fitted. Here, the pair of lock pieces 25a, 25b both extend along a direction in which the lid 17 is rotated to be attached to the housing 13 (i.e., rotation direction) as described above. The pair of slits 27a, 27b that receive the pair of lock pieces 25a, 25b are spaced apart from each other in the direction along the virtual plane, and the protective wall receiving openings 77 are opened in a direction opposite to the rotation direction of the protective wall 23.

Therefore, the pair of slits 27a, 27b disposed on two sides of the side wall 31 with the cable connection portion 63 sandwiched therebetween (i.e., the cable connection portion 63 is disposed between the pair of slits 27a, 27b) do not interfere with an arc-shaped trajectory of the rotational fitting, and the pair of lock pieces 25a, 25b rotationally moved along the virtual plane can be received from side end openings 85 of the protective wall receiving openings 77. When the lock pieces 25a, 25b provided on the two sides of the protective wall 23 of the lid 17 are respectively inserted into the slits 27a, 27b of the side wall 31, the lower end of the protective wall in the hanging-down direction is locked to the side wall 31, and the protective wall 23 is restricted from being separated (floated) from the side wall 31 so that the cable connection portion 63 can be reliably covered.

In the electric connection box 11 according to the present embodiment, the protective wall guide projection 89 provided at each of the protective wall receiving openings 77 of the slits 27a, 27b is provided on a side opposite to the side wall 31 with the slits 27a, 27b sandwiched therebetween. The protective wall guide projection 89 includes the widened tapered portion 91, the downward tapered portion 93, and the chamfered tapered portion 95.

The widened tapered portion 91 is provided on the front surface of the protective wall guide projection 89 in the direction from which the protective wall 23 enters, and is obtained by gradually widening the slit width toward the front side of each of the slits 27a, 27b. That is, the widened tapered portion 91 guides the lock pieces 25a, 25b into the slits 27a, 27b by bringing the lock pieces 25a, 25b into sliding contact with tapered surfaces that gradually narrow down toward the slits 27a, 27b. The widened tapered portion 91 can smoothly guide the lock pieces 25a, 25b of the protective wall 23 to the slits 27a, 27b when the lid 17 is rotationally fitted.

The downward tapered portion 93 is provided on the upper surface of the protective wall guide projection 89. The downward tapered portion 93 inclines downward toward the upper end opening 83 of each of the slits 27a, 27b that are opened between the side wall 31 and the protective wall guide projection 89. The downward tapered portion 93 smoothly guides the lock pieces 25a, 25b of the protective wall 23 to the slits 27a, 27b when the lid 17 is vertically fitted.

The chamfered tapered portion 95 is formed by chamfering the corner portion where the widened tapered portion 91, the downward tapered portion 93, and the projecting outer surface 97 of the protective wall guide projection 89 intersect with each other. When the lid 17 is fitted, the lower ends of the side edges on both sides of the protective wall approach the slits from the upper end openings of the protective wall receiving openings. At this time, the lower end of the protective wall may be inclined in a direction away from the side wall relative to the slits. The chamfered tapered portion can smoothly guide the lock pieces of the protective wall to the slits when the lid is inclined and fitted in this manner.

In the electric connection box 11 according to the present embodiment, the tubular portion 71 formed on at least the lock piece 25b of the pair of lock pieces 25a, 25b is formed integrally with the lock piece 25b by using the lock piece 25b as the tubular side wall 73. Since the tubular portion 71 is provided along the side edge 69 of the protective wall 23, a shape of the protective wall 23 can be maintained to be flat. As a result, the lock pieces 25a, 25b of the protective wall 23 of the electric connection box 11 can be stably inserted into the slits 27a, 27b, and the protective wall 23 locked to the slits 27a, 27b can be prevented from being easily separated from the slits 27a, 27b.

Therefore, according to the electric connection box 11 in the present embodiment whose lid 17 can be vertically fitted and rotationally fitted to the housing 13, it is possible to prevent water from entering into the cable connection portion 63 provided on the side wall 31 of the housing 13.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, an electric connection box (11) includes a housing (13) having an opening (33) formed by an upper end of each of a plurality of side walls (31), a lock protruding plate (15) protruding on an outer surface of a first side wall of the plurality of side walls (31), the first side wall being along a side (49) of the opening (33), a lid (17) configured to be attached to the housing (13) while covering the opening (33), a hook (19) protruding downward from the lid (17) a lock portion (21) provided on each of the lid (17) and the housing (13), a protective wall (23) protruding downward from the lid (17), a pair of lock pieces (25a, 25b) formed on side edges (69) on both sides of the protective wall (23), the side edges (69) being along a direction in which the protective wall (23) extends, and a pair of slits (27a, 27b) provided on a second side wall of the plurality of side walls (31). The hook (19) is configured to rotate the lid (17) such that the lid (17) is attached to the housing (13) with the hook (19) being engaged with the locking protruding plate (15). The lock portion (21) is configured to fix the lid (17) to the plurality of side walls (31). The protective wall (23) is configured to, when the lid (17) is attached to the housing (13), cover a cable connection portion (63) provided on the second side wall. The pair of lock pieces (25a, 25b) extend in parallel with the protective wall (23) and extend from the protective wall (23) toward a first direction. Each of the pair of slits (27a, 27b) respectively includes a receiving opening (for example, protective wall receiving opening 77) configured to, when the lid (17) is attached to the housing (13), accommodate respective one of the pair of lock pieces (25a, 25b), the pair of slits (27a, 27b) being configured to receive the respective one of the pair of lock pieces (25a, 25b) when engagement at the lock portion (21) is carried out or completed. The receiving opening (77) opens, when the lid (17) is attached to the housing (13), toward a second direction.

According to the electric connection box having the above described configuration, the lid can be vertically fitted and rotationally fitted to the opening of the housing. In vertical fitting, the lid is attached by being translated in a substantially vertical direction from above the housing and covering the opening. In rotational fitting, the lid is rotated about the hook by engaging the hook provided on the lid with the lock protruding plate provided on the side wall along a side of the housing. The rotated lid covers the opening and is attached to the housing. The lid attached to the housing is locked in a fitted state by the lock portion provided between the lid and the housing. The cable connection portion is provided on the outer surface of the side wall. The protective wall, which is parallel to the side wall and covers the cable connection portion from outside, hangs down from the lid. On the protective wall, the lock pieces parallel to the protective wall are formed on the corresponding side edges on both sides in the hanging-down direction. Accordingly, the pair of lock pieces are provided on the protective wall. The pair of lock pieces face the same direction with each other. The pair of slits are formed on the side wall provided with the cable connection portion, and the protective wall receiving openings for receiving the pair of lock pieces face the same direction with each other. Each of the protective wall receiving openings of the slits has an opened upper end and an opened side end that faces a corresponding one of the pair of lock pieces. When the lid is vertically fitted, lower ends of the side edges on both sides of the protective wall approach the slits from upper end openings of the protective wall receiving openings. When the lock pieces provided on the side edges on both sides of the protective wall of the lid are respectively inserted into the slits of the side wall, both sides of a lower end of the protective wall are locked to the side wall, and the protective wall is restricted from being separated from the side wall so that the cable connection portion can be reliably covered. One the other hand, in the electric connection box, the lid may be rotationally fitted. The protective wall is formed such that, for example, when the lock piece of one of the side edges extends toward a rotation axis, the lock piece of the other one of the side edges extends toward the same direction as the lock piece of the one side edge. That is, the lock pieces formed on the side edges on both sides are parallel to the protective wall and extend the same direction. The pair of slits that receive the pair of lock pieces are formed on the side wall provided with the cable connection portion. The pair of slits have the protective wall receiving openings that open another same direction to receive the pair of lock pieces. That is, at the time of rotational fitting, the pair of lock pieces facing the same direction are respectively received in the pair of protective wall receiving openings that open in the another same direction. The slits are arranged on the lower end of the protective wall in the hanging-down direction. When the lid is rotated and the engagement of the lock portion is started, the pair of slits are disposed in positions in the vertical direction to receive the lock pieces. When the protective wall hangs down along the side wall provided with the cable connection portion from, for example, a side of the lid that is orthogonal to the rotation center of the lid, the protective wall rotates in parallel to a virtual plane orthogonal to the rotation center when the lid is rotationally fitted. Here, the pair of lock pieces both face the rotation direction as described above. The pair of slits that receive the pair of lock pieces are spaced apart from each other in the direction along the virtual plane, and the protective wall receiving openings are opened in a direction opposite to the rotation direction of the protective wall. Therefore, the pair of slits disposed on two sides of the side wall with the cable connection portion sandwiched therebetween do not interfere with an arc-shaped trajectory of the protective wall, and the pair of lock pieces rotationally moved along the virtual plane can be received from side end openings of the protective wall receiving openings. When the lock pieces provided on both sides of the protective wall of the lid are respectively inserted into the slits of the side wall, the lower end of the protective wall in the hanging-down direction is locked to the side wall, and the protective wall is restricted from being separated from the side wall so that the cable connection portion can be reliably covered.

The electric connection box (11) may further include a protective wall guide projection (89) provided on the receiving opening (77). The protective wall guide projection (89) may include a first tapered portion (widened tapered portion 91) provided on an end surface of the protective wall guide projection (89) in the second direction, the first tapered portion (91) being formed such that a width of the pair of slits (27a, 27b) gradually increases toward the second direction), a second tapered portion (downward tapered portion 93) provided on an upper surface of the protective wall guide projection (89) and inclined downward toward an inner space within each of the pair of slits (27a, 27b) and a third tapered portion (chamfered tapered portion 95) formed by chamfering a corner portion defined by the first tapered portion (91), the second tapered portion (93), and an outer surface of the protective wall guide projection (89).

According to the electric connection box having the above configuration, the protective wall guide projection provided at each of the protective wall receiving openings of the slits is provided on a side opposite to the side wall with the slits interposed therebetween. The protective wall guide projection includes the widened tapered portion, the downward tapered portion, and the chamfered tapered portion. The widened tapered portion is provided on the front surface of the protective wall guide projection which the protective wall enters, and is obtained by gradually widening the slit width toward the front side of each of the slits. That is, the widened tapered portion guides the lock pieces into the slits by bringing the lock pieces into sliding contact with tapered surfaces that gradually narrow down toward the slits. The widened tapered portion can smoothly guide the lock pieces of the protective wall to the slits when the lid is rotationally fitted. The downward tapered portion is provided on the upper surface of the protective wall guide projection. The downward tapered portion inclines downward toward the upper end opening of each of the slits that are opened between the side wall and the protective wall guide projection. The downward tapered portion smoothly guides the lock pieces of the protective wall to the slits when the lid is vertically fitted. The chamfered tapered portion is formed by chamfering the corner portion where the widened tapered portion, the downward tapered portion, and the projecting outer surface of the protective wall guide projection intersect with each other. The chamfered tapered portion is formed on each of the pair of protective wall guide projections. When the lid is fitted, the lower ends of the side edges on both sides of the protective wall approach the slits from the upper end openings of the protective wall receiving openings. At this time, the lower end of the protective wall may be inclined in a direction away from the side wall relative to the slits. The chamfered tapered portion can smoothly guide the lock pieces of the protective wall to the slits when the lid is inclined and fitted in this manner.

In the electric connection box (11) a tubular portion (71) may be provided on at least one (25b) of the pair of lock pieces (25a, 25b), and the tubular portion (71) may extend along the one lock piece (25b) and share a portion of the one lock piece (25b) as a tubular side wall (73) with the one lock piece (25b).

According to the electric connection box having the above configuration, the tubular portion formed on at least the one lock piece of the pair of lock pieces is formed integrally with the one lock piece by using the one lock piece as the tubular side wall. Since the tubular portion is provided along the side edge of the protective wall, a shape thereof can be maintained at a high flatness. As a result, the lock pieces of the protective wall of the electric connection box can be stably inserted into the slits, and the protective wall locked to the slits can be prevented from being easily separated from the slits.

The first side wall and the second side wall may intersect with each other.

The first side wall and the second side wall may be orthogonal to each other.

The first direction and the second direction may be opposite to each other.

What is claimed is:

1. An electric connection box comprising:
    a housing having an opening formed by an upper end of each of a plurality of side walls;
    a lock protruding plate protruding on an outer surface of a first side wall of the plurality of side walls, the first side wall being along a side of the opening;
    a lid configured to be attached to the housing while covering the opening;
    a hook protruding downward from the lid;
    a lock portion provided on each of the lid and the housing;
    a protective wall protruding downward from the lid;
    a pair of lock pieces formed on side edges on both sides of the protective wall, the side edges being along a direction in which the protective wall extends; and a pair of slits provided on a second side wall of the plurality of side walls, wherein the hook is configured to rotate the lid such that the lid is attached to the housing with the hook being engaged with the locking protruding plate, wherein the lock portion is configured to fix the lid to the plurality of side walls, wherein the protective wall is configured to, when the lid is attached to the housing, cover a cable connection portion provided on the second side wall, wherein the pair of lock pieces extend in parallel with the protective wall and extend from the protective wall toward a first direction, wherein each of the pair of slits respectively includes a receiving opening configured to, when the lid is attached to the housing, accommodate respective one of the pair of lock pieces, the pair of slits being configured to receive the respective one of the pair of lock pieces when engagement at the lock portion is carried out, and wherein the receiving opening opens, when the lid is attached to the housing, toward a second direction.

2. The electric connection box according to claim 1, further comprising:

a protective wall guide projection provided on the receiving opening, wherein the protective wall guide projection comprises:

a first tapered portion provided on an end surface of the protective wall guide projection in the second direction, the first tapered portion being formed such that a width of the pair of slits gradually increases toward the second direction;

a second tapered portion provided on an upper surface of the protective wall guide projection and inclined downward toward an inner space within each of the pair of slits; and a third tapered portion formed by chamfering a corner portion defined by the first tapered portion, the second tapered portion, and an outer surface of the protective wall guide projection.

3. The electric connection box according to claim 1, wherein a tubular portion is provided on at least one of the pair of lock pieces, and wherein the tubular portion extends along the one lock piece and shares a portion of the one lock piece as a tubular side wall with the one lock piece.

4. The electric connection box according to claim 1, wherein the first side wall and the second side wall intersect with each other.

5. The electric connection box according to claim 4, wherein the first side wall and the second side wall are orthogonal to each other.

6. The electric connection box according to claim 1, wherein the first direction and the second direction are opposite to each other.

\* \* \* \* \*